April 4, 1950 — A. J. KIEHNE — 2,502,854
DIE ADJUSTMENT DEVICE
Filed Sept. 6, 1944
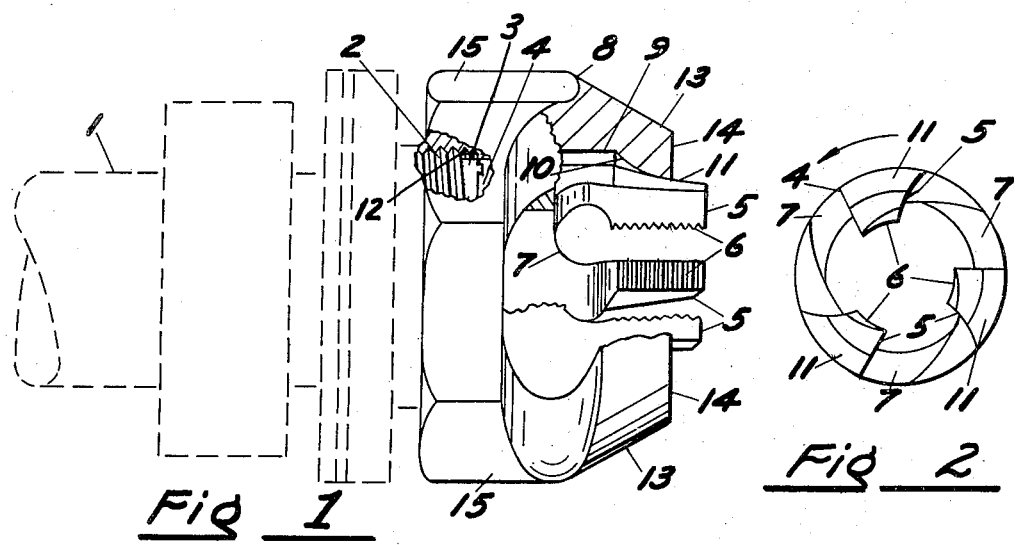
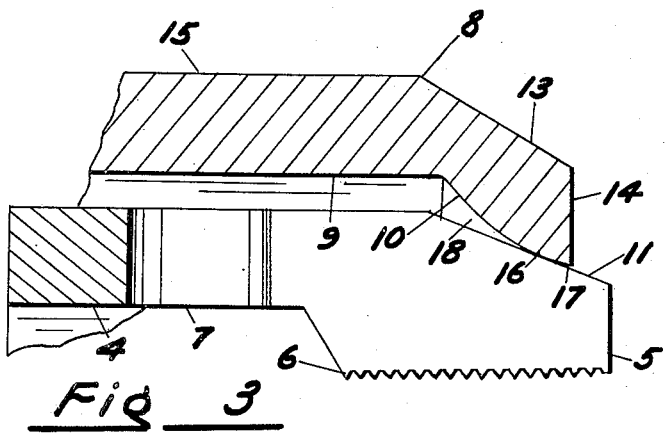
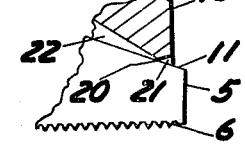
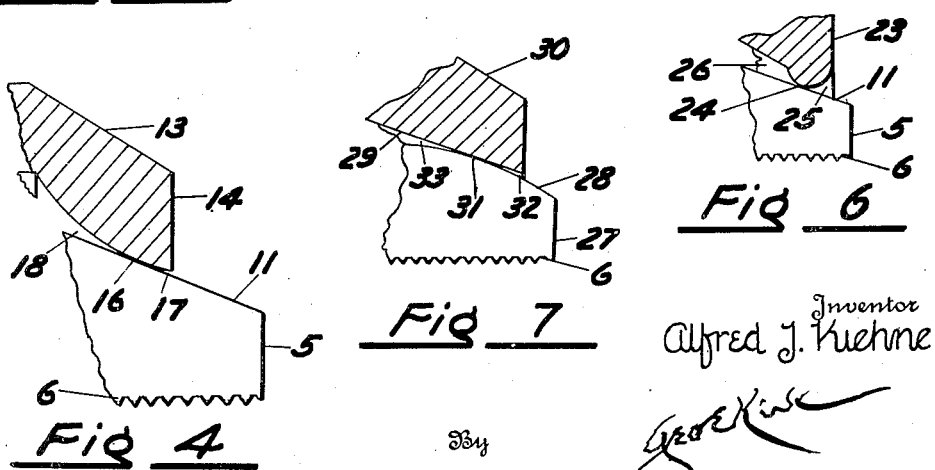
Inventor
Alfred J. Kiehne
By
Attorney Patented Apr. 4, 1950

2,502,854

UNITED STATES PATENT OFFICE 2,502,854

DIE ADJUSTMENT DEVICE

Alfred J. Kiehne, Toledo, Ohio, assignor to Union Twist Drill Company, Athol, Mass., a corporation of Massachusetts Application September 6, 1944, Serial No. 552,869

3 Claims. (Cl. 10—119)

This invention relates to surface treating tools, more particularly in setting and holding during use for precision performance of adjustable thread-cutting dies.

This invention has utility in developing accuracy of contour relatively to an axis in such operations as surface treating or thread cutting, in which an embracing or surrounding tool may act upon the exterior of an article of work. In the instance of a thread cutting die, the adjustment hereunder may hold against distortion of the helix in a tap, bolt, screw, or such product operated upon.

Referring to the drawings:

Fig. 1 is a side view, with parts broken away, of an embodiment of the invention in a thread cutting die type of tool;

Fig. 2 is an end view, from the right of Fig. 1, of the multi-prong or finger die of the collet type;

Fig. 3 is a somewhat enlarged scale fragmentary view of a die prong, say at initial position of the adjusting ring therewith, showing the line-contact-approximating relation therebetween;

Fig. 4 is a similar view, somewhat exaggerated in dimension, showing the parallel transit adjustment for the prong to take up die wear;

Fig. 5 is a detail view showing the line-contact-approximating relation between the adjusting ring and set of prongs, with the ring portions diverging in straight tapering directions;

Fig. 6 is a detail showing a more abrupt convex face for the adjusting ring against the prong taper than the arc or convex form of Fig. 3; and Fig. 7 is a detail showing the converse line-contact establishing relation to that of Fig. 3.

In a machine tool assembly, a spindle 1 is provided with an externally threaded terminal portion 2, with a reduced diameter means 3 for concentric key mounting of a ring member 4, having an annular series of arms fingers, or prongs 5 with inwardly-directed cutting-face portions 6 in angularly rigid uniform relative spacing for establishing a helix in thread-cutting operation. Near the bases of the prongs 6, clearance regions 7 toward the member 4, establish a region which may respond to slight radial flexure, even tho the die material be of a considerable degree of hardness, say in the range of above 60, on the scale of hardness of 100 for diamond. Alloy tools for cutting of hardness, even up to 63½ may respond to a prong control or precision placing under the disclosure herein.

Coacting with the threaded portion 2 is an internally threaded adjusting ring or cap 8, having beyond its internally threaded portion a clearance region 9 to an embracing or adjustment effecting portion 10 to contact taper face portions 11 of the prongs 5. These exterior flare regions 11 of the prongs 5 as contacted by the convex portion 10 of the cap establish in a peripherally extending direction line-contact-approximation interrelation. The cap 8, remote from its internally threaded portion 12, has an external conical or taper portion 13 to an abrupt ring-forming end 14, thru the opening in which the free ends of the prongs 5 may protrude. For bringing the cap 8 into the desired angular relation with the spindle 1 in the adjustment procedure hereunder, polygonal region 15 is provided for wrench engagement.

The finished conical face portions 11, as the cap 8 is positioned therewith, have line-contact-approximation region 16, from which toward the free ends of the prongs 5, there is a clearance region 17 toward the cap end 14. In the other direction, or inward, from the region 16, there is also clearance region 18 toward the clearance 9.

While the cutting tool proper including the prongs 5 may be an alloy of hardness to withstand effective cutting use for extended periods of time, the cap or adjusting ring 8 has physical strength, is rigid against fracture under strain, and desirably has its face 10 of sufficient hardness that it may hold its line-contact-approximation regions local or not materially broadened, and thereby have a non-gouging smooth riding-over relation with the prong portions 11. This narrow or line-approximation relation, insures that the urge of the cap 8 as transmitted to the prongs 5, is radial, not a twist or arc distortion. There is no gripping of the prong 5 to otherwise alter its angular relation as to its mounting ring 4. This means that side warp or twist of the prongs does not occur. Furthermore, there is no crushing to crowd the prong free end inward in advance of the after portion of such prong. The great hardness of the prong-carrying unit tends to reduce resiliency and render more susceptible to collapse or rupture. However, the gradual uniform urge or crowding action of the cap is so symmetrically distributed in the smooth sliding relation between the engaging faces, without tendency to gouge that the initial setting for the helix may be that at which it was formed and be in precision trueness therewith. From such a stage at starting, use wear as uniform, may be taken up, as in the adjustment from the showing in Fig. 3 to that of Fig. 4, by moving inward uniformally throughout the working face respective extent of the cutting portion 6 of the prong 5 being shifted toward the axis of the work and initial axis of the die. This is effected thru the relative axial shifting of the cap 8.

This performance of adjustment is of material value in shop practice, for greater life in service for the die, due to the extra hardness which may be adopted for the alloy in manufacture. Even were the die not so improved, the non-distortion adjustment against departure from initial precision, steps up output in the close tolerance ranges. The endurance and adjustment ease are further factors in reducing manufacturing costs in time to be required in tool placing and upkeep. The power equipment of the plant has thus reduced down or inactive time to be charged thereagainst.

The adjusting ring or cap may have its reduced-diameter open-ended ring portion 19 (Fig. 5) with its prong-contacting or embracing portion with a line contact 20 from which diverge forward outward flare portion 21, and after outward flare portion 22. The functioning is that the portion 19 is substantial to hold the line portion 20, with the taper angle sufficient to be clear of the taper 11 on each side of the contact at the line region 20, even as such may be shifted further from the tip of the prong 5.

A cap embracing portion 23 for the prongs 5 (Fig. 6) has a shorter radius convex region providing portion, than the showing in Fig. 3. However, there is a line-contact-approximation region 24 (Fig. 6), with a clearance 25 one way and a clearance 26 the other way therefrom. With the line of contact away from the end, there is strength in the cap or adjusting ring to resist fracture. The clearances from the prong as away from the line of contact, avoid frictional locking.

A prong 27 (Fig. 7) may have a convex outer face 28 to be engaged by a taper portion 29 of a cap portion 30. This also provides a line-contact-approximation region 31, with a forward or one way clearance 32 and an after or other way clearance 33. During the adjustment here, the contact lines here, as in the disclosure of Fig. 3, may have more wide departure from a single circle than the showings of Figs. 5, 6.

The invention of this disclosure makes possible maintenance of the original precision helix direction or track as to the succession of prongs at the wear take-up adjustments. This means that there is an achieved holding to the initial pitch diameter. A type of adjustment face which might develop a friction locking would mean that further adjustment attempt would tend to wreck the tool. Friction locking is herein avoided, as also scoring.

What is claimed and it is desired to secure by Letters Patent is:

1. An adjusting device comprising a collet ring, prongs projecting axially in the same direction from the ring and integrally joined thereto, the outer faces of the prongs at the ends thereof remote from the ring converging toward the common axis of the prongs and toward said ends, the radially inner faces of the prongs being provided with a series of circumferentially extending ridges in helical alinement forming work-coacting-face sections each prong being provided with a non-radial face defining with said ridges thread cutting edges for the work-coacting-face section of said prong, the region of joinder of the prongs to the ring being of thinner section than the prong at the adjacent work-coacting-face section to provide portions of greater radial flexibility, the ring having, extending from the side thereof opposite the prongs, a threaded section, and a relatively rotatable and axially shiftable member threadedly connected to the said threaded section and embracing the prongs and having a bore providing a face bearing on the said converging outer faces of the prongs only on a substantially circumferential line contact whereby during radial deflection of the prongs by the adjustment member, twist of the prongs arcuately is reduced.

2. An adjusting device comprising a collet ring, prongs projecting axially in the same direction from the ring and integrally joined thereto, the outer first faces of the prongs at the ends thereof remote from the ring converging toward the common axis of the prongs and toward said ends, the radially inner faces of the prongs being provided with a series of circumferentially extending ridges in helical alinement forming work-coacting-face sections, each prong being provided with a non-radial face defining with said ridges thread cutting edges for the work-coacting-face section of said prong, the region of joinder of the prongs to the ring being of thinner section than the adjacent work-coacting-face section of the prong to provide portions of greater radial flexibility, the ring having, extending from the side thereof opposite the prongs, a threaded section, and a relatively rotatable and axially shiftable cap member threadedly connected to the said threaded section, embracing the prongs and having a bore providing a second face bearing on the said converging outer first faces of the prongs, of which first and second faces one is tapered and the other convex coacting for said bearing only on a substantially circumferential line contact, whereby during radial deflection of the prongs by the adjustment cap member, twist of the prongs arcuately is sufficiently reduced to be negligible in practice.

3. An adjusting device comprising a collet ring, prongs projecting axially in the same direction from the ring and integrally joined thereto, the outer first faces of the prongs at the ends thereof remote from the ring converging toward the common axis of the prongs and toward said ends, the radially inner faces of the prongs being provided with work-coacting-face sections, each prong being provided with a non-radial face defining an edge for the work-coacting-face section of said prong, the region of joinder of the prongs to the ring being of thinner section than the adjacent portion of the work-coacting-face section of the prong to provide portions of greater radial flexibility, the ring having, extending from the side thereof opposite the prongs, a threaded section, and a relatively rotatable and axially shiftable cap member threadedly connected to the said threaded section, embracing the prongs and having a bore providing a second face bearing on the said converging outer first faces of the prongs, of which first and second faces one is tapered and the other convex coacting for said bearing only on a substantially circumferential line contact at all positions of adjustment being spaced sufficiently inward from the ends of the work-coacting-face sections whereby during radial deflection of the prongs by the adjustment cap member, twist of the prongs is reduced to be negligible in practice.

ALFRED J. KIEHNE.

(References on following page)

REFERENCES CITED

The following references are of record in the file of this patent:

UNITED STATES PATENTS

| Number | Name | Date |
|---|---|---|
| 471,925 | Whitaker | Mar. 29, 1892 |
| 974,545 | Baldwin | Nov. 1, 1910 |
| 1,140,594 | Howe | May 25, 1915 |
| 1,155,211 | Carpenter | Sept. 28, 1915 |
| 1,227,632 | Lagerbach | May 29, 1917 |
| 1,372,482 | Clare | Mar. 22, 1921 |
| 1,945,906 | Koehler | Feb. 6, 1934 |
| 2,018,452 | Laughlin | Oct. 22, 1935 |
| 2,063,980 | Bruce | Dec. 15, 1936 |
| 2,188,788 | Kiehne | Jan. 30, 1940 |
| 2,251,336 | Judge | Aug. 5, 1941 |
| 2,348,727 | Cote | May 16, 1944 |

FOREIGN PATENTS

| Number | Country | Date |
|---|---|---|
| 73,940 | Switzerland | Dec. 29, 1892 |
| 402,536 | Great Britain | Dec. 7, 1933 |
| 628,639 | Germany | Apr. 21, 1935 |